No. 785,018. PATENTED MAR. 14, 1905.
I. P. NORTON.
DENTAL FORCEPS.
APPLICATION FILED SEPT. 3, 1904.
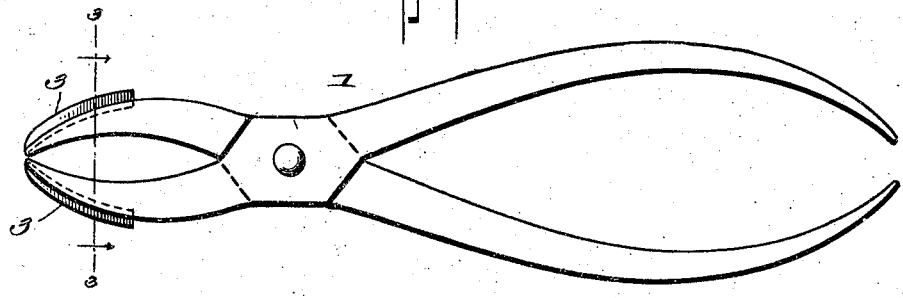
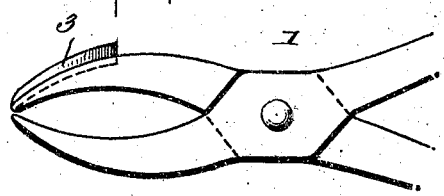
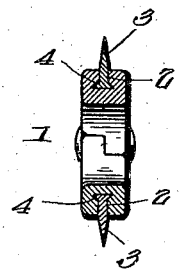
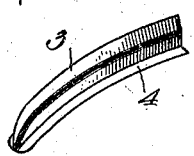
Witnesses:
E. H. Stewart
R. M. Elliott
Ira P. Norton,
Inventor,
by C. A. Snow & Co.
Attorneys.

No. 785,018. Patented March 14, 1905.

UNITED STATES PATENT OFFICE.

IRA P. NORTON, OF LAPORTE, INDIANA.

DENTAL FORCEPS.

SPECIFICATION forming part of Letters Patent No. 785,018, dated March 14, 1905.

Application filed September 3, 1904. Serial No. 223,271.

*To all whom it may concern:*

Be it known that I, IRA P. NORTON, a citizen of the United States, residing at Laporte, in the county of Laporte and State of Indiana, have invented a new and useful Dental Forceps, of which the following is a specification.

This invention relates to dental forceps.

The object of the invention is to dispense with the employment of a lancet as a separate implement in cutting the gums when a root is to be removed and in lieu thereof to effect the requisite cutting as the jaws of the forceps are pushed to position to grasp a root.

With the above and other objects in view, as will appear as the nature of the invention is better understood, the same consists, generally stated, in a pair of forceps having a lancet combined with one of its jaws.

The invention consists, further, in a pair of forceps having a detachable lancet combined with one of its jaws.

The invention consists, further, in a pair of forceps having the outer side of each of its jaws provided with a longitudinal groove and lancets removably mounted within the grooves.

The invention consists, further, in the novel construction and combination of parts of a pair of dental forceps, as will be hereinafter fully described and claimed.

In the accompanying drawings, forming a part of this specification, and in which like characters of reference indicate corresponding parts, there are illustrated two forms of embodiment of the invention, each capable of carrying the same into practical operation, it being understood that the elements therein exhibited may be varied or changed as to shape, proportion, and exact manner of assemblage without departing from the spirit thereof.

In the drawings, Figure 1 is a view in elevation of one form of embodiment of the invention. Fig. 2 is a detail view of a slightly-modified form. Fig. 3 is a view in transverse section, taken on the line 3 3, Fig. 1, and looking in the direction of the arrow thereon. Fig. 4 is a perspective detail view of the forceps. Fig. 5 is a detached detail view of a slightly-modified form of forceps-jaw.

Referring to the drawings and to Fig. 1 thereof, 1 designates generally a pair of dental forceps, which may be of any character, it being understood that the invention is adaptable to forceps for drawing the roots of incisors, canines, bicuspids, and molars, and as this will be readily understood illustration of more than one form of forceps is deemed unnecessary.

As above stated, it is the object of the invention to dispense with the employment of a lancet to cut the gums, which frequently has to be resorted to where the root of the tooth is some distance below the gum-line, and this is secured in the present instance by providing the outer side of each of the jaws with a longitudinal groove 2, which is herein shown as dovetailed, although it may be of other contours, and which extends throughout a greater portion of the length of the jaw. These grooves are engaged by lancets 3, consisting of an appropriately-shaped blade having a thin cutting edge and a dovetailed base 4 to engage the groove 2 and be held therein against accidental separation, but will permit ready removal of the blade for purpose of sharpening, cleansing, or for any other reason. In some instances it will not be necessary to cut the gums on both sides of a root, and under these conditions one of the lancets may be removed, or, if preferred, as shown in Fig. 2, but one of the jaws will be provided with a lancet.

The utility and mode of operation of this device will be apparent, as it will be seen that its use facilitates the extraction of a root, inasmuch as one operation heretofore necessary is eliminated—namely, the separate cutting of the gums. The use of such forceps will also largely remove a dread that most people have of having a root removed where they know in advance that the gum will have to be cut. The use of this device, as will be apparent, renders such preliminary operation unnecessary.

While it will generally be preferred to have the lancet made detachable from the jaw of the forceps, if preferred it may be integral therewith, as shown in Fig. 5, and still be within the scope of the invention.

The forms herein shown are those that will be found thoroughly effective in use; but it is to be understood that the invention is not to be limited to the precise construction shown, as changes as to the shape of the lancet or lancets and of the walls of the grooves may be adopted without departing from the scope of the invention.

Having thus described the invention, what is claimed is—

1. A pair of forceps having a lancet combined with the outer side of one of its jaws.

2. A pair of forceps having a detachable lancet combined with the outer side of one of its jaws.

3. A pair of forceps having the outer side of each of its jaws provided with a longitudinal groove, and lancets removably mounted within the grooves.

In testimony that I claim the foregoing as my own I have hereto affixed my signature in the presence of two witnesses.

IRA P. NORTON.

Witnesses:
NORMAN F. WOLFE,
CHAS. E. WOLFE.